(12) United States Patent
Ullein et al.

(10) Patent No.: US 11,125,303 B2
(45) Date of Patent: Sep. 21, 2021

(54) TENSIONING DEVICE FOR A CHAIN DRIVE

(71) Applicant: Schaeffler Technologies AG & Co. KG, Herzogenaurach (DE)

(72) Inventors: Thomas Ullein, Herzogenaurach (DE); Rainer Fuhrmann, Waischenfeld (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 382 days.

(21) Appl. No.: 16/095,137

(22) PCT Filed: May 3, 2017

(86) PCT No.: PCT/DE2017/100372
§ 371 (c)(1),
(2) Date: Oct. 19, 2018

(87) PCT Pub. No.: WO2017/190738
PCT Pub. Date: Nov. 9, 2017

(65) Prior Publication Data
US 2019/0128389 A1    May 2, 2019

(30) Foreign Application Priority Data
May 4, 2016  (DE) .......................... 102016207779.1

(51) Int. Cl.
*F16H 7/08*    (2006.01)
(52) U.S. Cl.
CPC ............. *F16H 7/0834* (2013.01); *F16H 7/08* (2013.01); *F16H 7/0829* (2013.01);
(Continued)

(58) Field of Classification Search
CPC ................. F16H 2007/0812; F16H 2007/0814
(Continued)

(56) References Cited

U.S. PATENT DOCUMENTS 5,860,881 A * 1/1999 Tada ..................... F16H 7/0848
474/110
5,879,256 A * 3/1999 Tada ........................ F16H 7/08
474/110
(Continued)

FOREIGN PATENT DOCUMENTS

CN        1384297       12/2002
DE     102011079184     1/2013
(Continued)

*Primary Examiner* — Henry Y Liu
(74) *Attorney, Agent, or Firm* — Volpe Koenig

(57) ABSTRACT

A hydraulic tensioning device for a chain drive of an internal combustion engine, having a receptacle and having a tensioning piston which is guided in displaceable fashion in a cylindrical hollow space of the receptacle and which has a piston hollow space, wherein the piston hollow space together with the cylindrical hollow space of the receptacle forms a pressure chamber, and having a pressure relief valve unit arranged in the piston hollow space. The pressure relief valve unit is a preassembled structural unit and comprises a spring, a closing body and a valve seat and also a valve receptacle which surrounds the valve seat in a first subsection, wherein the valve receptacle forms an interference fit with the valve seat, and wherein the valve receptacle or the valve seat in a second subsection form an interference fit with the inner shell surface of the tensioning piston.

16 Claims, 2 Drawing Sheets

(52) U.S. Cl.
CPC .............. *F16H 2007/0806* (2013.01); *F16H 2007/0812* (2013.01); *F16H 2007/0814* (2013.01); *F16H 2007/0859* (2013.01)

(58) Field of Classification Search
USPC ........................................................ 474/110
See application file for complete search history.

(56) References Cited

U.S. PATENT DOCUMENTS

| | | | | | |
|---|---|---|---|---|---|
| 6,165,090 | A * | 12/2000 | Simpson | ............... | F16H 7/0848 137/199 |
| 6,193,623 | B1 * | 2/2001 | Koch | ................... | F16H 7/0836 474/110 |
| 6,322,468 | B1 * | 11/2001 | Wing | ........................ | F16H 7/08 474/109 |
| 6,361,458 | B1 * | 3/2002 | Smith | ................... | F16H 7/0848 474/109 |
| 6,383,103 | B1 * | 5/2002 | Fujimoto | ................... | F01L 1/02 474/109 |
| 6,398,682 | B1 * | 6/2002 | Suzuki | ..................... | F16H 7/08 474/110 |
| 6,435,993 | B1 * | 8/2002 | Tada | .................... | F16H 7/0836 474/109 |
| 6,729,986 | B2 * | 5/2004 | Kurohata | ............. | F16H 7/0848 474/110 |
| 7,174,799 | B2 * | 2/2007 | Yoshida | ............... | F16H 7/0836 474/101 |
| 8,221,274 | B2 * | 7/2012 | Sato | ..................... | F16H 7/0836 474/110 |
| 9,212,730 | B2 * | 12/2015 | Tyroller | ............... | F16H 7/0836 |
| 9,556,963 | B2 * | 1/2017 | Hartmann | ............ | F16K 15/044 |
| 10,323,730 | B2 * | 6/2019 | Kunimatsu | ........... | F16H 7/0836 |
| 10,443,691 | B2 * | 10/2019 | Fischer | ............... | F16K 17/0413 |
| 10,753,433 | B2 * | 8/2020 | Watanabe | ............ | F16H 7/0836 |
| 2002/0022541 | A1 * | 2/2002 | Ullein | ................... | F16H 7/0836 474/110 |
| 2006/0003859 | A1 * | 1/2006 | Sato | ..................... | F16H 7/0836 474/110 |
| 2006/0089221 | A1 * | 4/2006 | Hashimoto | ............... | F01L 1/02 474/110 |
| 2006/0094549 | A1 * | 5/2006 | Yoshida | ................ | F16H 7/0836 474/110 |
| 2006/0270500 | A1 * | 11/2006 | Yamamoto | ........... | F16H 7/0836 474/109 |
| 2007/0249444 | A1 * | 10/2007 | Yoshida | ................ | F16H 7/0836 474/110 |
| 2007/0270259 | A1 * | 11/2007 | Koch | .................... | F16H 7/0848 474/110 |
| 2008/0015069 | A1 * | 1/2008 | Kroon | .................. | F16H 7/0836 474/110 |
| 2008/0090685 | A1 * | 4/2008 | Namie | .................. | F16H 7/0836 474/110 |
| 2008/0280712 | A1 * | 11/2008 | Ryouno | ................ | F16H 7/0848 474/110 |
| 2010/0004080 | A1 * | 1/2010 | He | .......................... | F16K 17/10 474/110 |
| 2010/0093474 | A1 * | 4/2010 | Onimaru | ................ | F16H 7/0848 474/110 |
| 2011/0015013 | A1 * | 1/2011 | Hofmann | .............. | F16H 7/0848 474/110 |
| 2011/0263366 | A1 * | 10/2011 | Botez | .................... | F16H 7/0848 474/110 |
| 2013/0017913 | A1 * | 1/2013 | Hartmann | ............. | F16H 7/0848 474/110 |
| 2013/0303318 | A1 * | 11/2013 | Hofmann | .............. | F16H 7/0836 474/110 |
| 2013/0303319 | A1 * | 11/2013 | Fischer | ..................... | F16H 7/08 474/110 |
| 2015/0226345 | A1 * | 8/2015 | Hartmann | ............. | F16K 15/044 137/539 |
| 2016/0327135 | A1 * | 11/2016 | Fischer | ................. | F16H 7/0836 |
| 2017/0356528 | A1 * | 12/2017 | Fischer | ..................... | F16H 7/08 |
| 2017/0363181 | A1 * | 12/2017 | Freemantle | ........... | F16H 7/0848 |

FOREIGN PATENT DOCUMENTS

| | | |
|---|---|---|
| DE | 102012216056 | 3/2014 |
| DE | 102013225984 | 6/2015 |
| DE | 102015200606 | 7/2016 |
| WO | 2007122013 | 11/2007 |

\* cited by examiner

TENSIONING DEVICE FOR A CHAIN DRIVE

BACKGROUND

The invention relates to a hydraulic tensioning device for a chain drive of an internal combustion engine. Chain drives generally comprise a drive sprocket that is connected to the crankshaft, a driven sprocket connected to a camshaft, and a timing chain that connects the drive sprocket to the driven sprocket. Via the tensioned section of the drive timing chain, the driving moment of the crankshaft is transmitted to the camshaft. The timing chain is tensioned on its slack section, in order to be able to guarantee its functionality during its operating period. For this purpose, the timing chain is loaded with a force by a tensioning device.

DE 10 2011 079 184 A1 shows a hydraulic tensioning device for an internal combustion engine. The device comprises a housing and a hollow piston that can move in the housing and defines, together with the housing, a pressure chamber. Within the hollow piston there is a pressure relief valve by which the pressure within the pressure chamber can be limited to a predetermined value. The pressure relief valve is a structural unit that can be preassembled and includes a valve housing, a valve cover, a valve body, and a valve spring, wherein the valve housing and the valve cover are made from plastic. The pressure relief valve is pressed into the hollow piston. In some applications, it can be necessary to increase the resistance of the pressure relief valve unit against the influence of cavitation.

The later-published DE 10 2013 225 984 A1 shows another pressure relief valve assembly. A pot-shaped valve housing that is held by an interference fit in a cylindrical receptacle of a piston of a hydraulic chain tensioning device is disclosed. In a central stepped hole of the valve housing, a guide element is inserted that forms a closed rim on the outside, whose end area is inserted into an annular groove of the valve housing. The guide element forms, on the inside, a valve seat with a central opening that can be closed by a spring-loaded valve plate. For defining the guide element in the valve housing, there is a projecting shoulder of the valve housing formed radially on the inside, whereby a bead is produced.

SUMMARY

Therefore, the object of the invention is to provide a tensioning device, whose pressure relief valve unit that can be preassembled, has resistant properties and can also be manufactured and assembled cost-effectively.

This objective is achieved by a hydraulic tensioning device with one or more features of the invention. Accordingly, the object is achieved by a hydraulic tensioning device for a chain drive of an internal combustion engine with a receptacle and with a tensioning piston that is guided so that it can move in a cylindrical hollow space of the receptacle and has a piston hollow space, wherein the piston hollow space forms, together with the cylindrical hollow space of the receptacle, a pressure chamber, as well as with a pressure relief valve unit arranged in the piston hollow space. The pressure relief valve unit is a structural unit that can be preassembled and comprises a spring, a closing body, and a valve seat comprising a first sub-section and a second sub-section, as well as a valve receptacle surrounding the valve seat in a first sub-section, wherein the valve receptacle forms, with the valve seat, an interference fit and wherein the valve receptacle in the first sub-section or the valve seat in the second sub-section connecting to the first sub-section or both form, with the inner lateral surface of the tensioning piston, an interference fit.

The pressure relief valve can be preassembled as one module and is simultaneously cost-effective in its production. The valve seat can be inserted, for example, in one piece, into the valve receptacle, whereby the spring (for example, a spiral spring) and closing body (for example, a valve ball or a valve plate) can be held captively within the pressure relief valve unit. The valve seat can also form a support surface for the main spring on its end side facing the pressure chamber. The main spring is arranged in the pressure chamber and is supported directly or indirectly against a surface of the receptacle on one side and a surface of the piston on the other side.

Preferably, only the valve receptacle in the first sub-section or only the valve seat in a second sub-section form, with the inner lateral surface of the tensioning piston, an interference fit. More preferably, the valve receptacle is made from sheet metal using a deep-drawing process.

One especially favorable option for creating an interference fit between the piston and the pressure relief valve unit is created in that the valve receptacle is made from a plastic or a metallic, non-hardened material.

In an extremely favorable construction in terms of production costs, the tensioning piston is produced as a molded part. One advantage of this embodiment is that the inner lateral surface of the tensioning piston does not require rework after it is manufactured by molding. In particular, the inner lateral surface of the tensioning piston constructed preferably as a deep-drawn or extruded part does not require cutting processing. The introduction of a valve receptacle with non-hardened surface permits looser tolerances—despite the formation of an interference fit between components that have a hardened surface. The production costs of the tensioning device are reduced. In one implementation, the tensioning piston is produced as an extruded part.

An especially favorable construction in terms of production costs enables an embodiment in which the ends of the pressure relief valve unit define a supply and discharge end, wherein the valve receptacle on the discharge end has a recess and a surface for supporting the spring and the valve receptacle holds the valve seat by means of the supply end. In this way, the number of required components can be reduced. The pressure relief valve unit can be tailored, under otherwise identical construction, to the specific application by adapting the properties of the spring to the specific requirements. The spring force determines the predefined pressure that sets the boundaries of the pressure chamber. In one implementation, the valve seat on the supply end has a recess and a sealing surface for the closing body.

One especially preferred embodiment relates to a tensioning device with a pressure relief valve unit, wherein the valve seat in the first sub-section has a smaller diameter than in the second sub-section. The larger diameter of the second sub-section enables, on one hand, the production of an interference fit with the inner lateral surface of the tensioning piston. On the other hand, as long as the interference fit is produced in the area of the first sub-section, the outer lateral surface of the second sub-section can be used as a guide.

In one advantageous refinement, the closing body has a spherical or plate-shaped construction. Plate-shaped closing bodies offer an advantageous response behavior for pressure relief valves and enable advantages with respect to the required installation space.

An especially simple molding is made possible in that the valve receptacle forms, in the first sub-section with the inner lateral surface of the tensioning piston, an interference fit, wherein the valve receptacle has, on the end holding the valve seat, an engagement position. In this way, larger tolerances can be provided, which has advantageous effects on the production costs of the overpressure valve unit and the tensioning piston. In particular, rework on the inner lateral surface of the tensioning piston, for example, can be eliminated.

In another advantageous embodiment, the tensioning piston or the inner lateral surface of the piston hollow space can have a hardened design, wherein the valve seat is made from a metallic material and wherein the valve seat or the surface of the valve seat can have a hardened design.

In another advantageous construction, the pressure relief valve unit comprises a ball as a closing body and an inner guide, wherein the inner guide is held by a base of the valve receptacle. The inner guide can be arranged, for example, along the entire axial length of the inner periphery of the valve receptacle and can have three connecting pieces extending in the axial direction.

In another advantageous embodiment, the tensioning piston is used in a chain drive for an internal combustion engine with a drive sprocket and with a driven sprocket and also with a timing chain, wherein the timing chain couples the drive sprocket and the (at least one) driven sprocket and wherein the timing chain is tensioned via a tensioning device having one or more features of the invention. Sudden tensioning of the slack section can lead to excessive loading of the timing chain. Special advantages of the embodiment are realized in that the tensioning device reduces negative effects of sudden tensioning and its properties exhibit a resistant behavior during its operating period.

BRIEF DESCRIPTION OF THE DRAWINGS

The invention will now be explained in more detail with reference to embodiments, wherein reference is made to the drawings. Functionally identical elements of the explained embodiments are marked with the same reference symbols.

DETAILED DESCRIPTION

Figure 1:
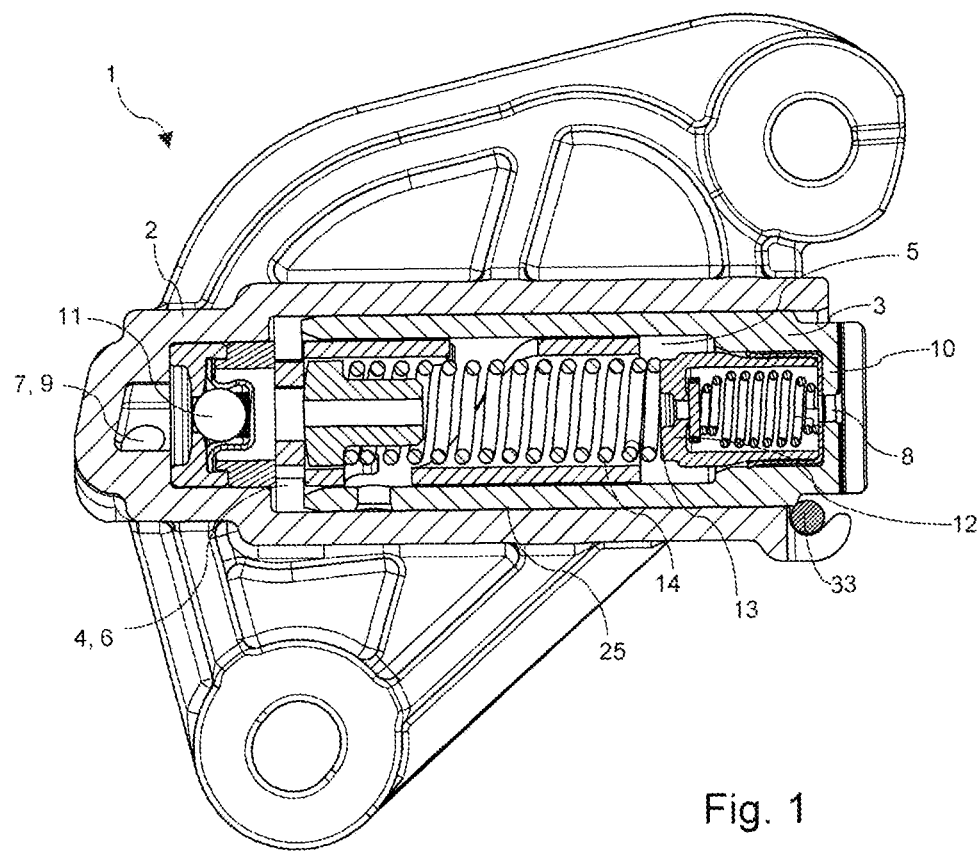
FIG. 1 shows a hydraulic tensioning device in the longitudinal section.

In FIG. 1, a hydraulic tensioning device 1 is shown for a chain drive of an internal combustion engine in a longitudinal section. A chain drive comprises a drive sprocket connected to the crankshaft, a driven sprocket connected to a camshaft, and a timing chain that connects the drive sprocket to the driven sprocket (not shown). Via the tensioned section of the drive timing chain, the driving moment of the crankshaft is transmitted to the camshaft. The timing chain is tensioned on its slack section, in order to be able to guarantee its functionality throughout its operating period. For this purpose, the timing chain is loaded with a tensioning force by the tensioning device.

The hydraulic tensioning device 1 includes a receptacle 2 and a tensioning piston 3 that is guided so that it can move axially in a cylindrical hollow space 4 of the receptacle 2 and is held by a securing wire 33 in a transport position. The tensioning piston 3 is constructed with a piston hollow space 5 that forms, together with the cylindrical hollow space 4 of the receptacle 2, a pressure chamber 6. The tensioning piston 3 and receptacle 2 are constructed as a mechanical piston locking unit 25. A recess 7 is arranged at the end of the receptacle 2 that is opposite the opening for assembling the tensioning piston 3. The supply of hydraulic medium into the pressure chamber is realized via the recess 7. At the end of the tensioning piston 3 that is at a distance from the receptacle 2, there is another recess 8, by which some part of the hydraulic medium can be discharged. The ends form the supply and the discharge end 9, 10 of the tensioning device.

At the supply end 9 of the tensioning device 1, within the pressure chamber 6 there is a check valve 11 that releases the hydraulic agent flow in the supply direction and prevents the discharge from the pressure chamber 6. At the discharge end 10 of the tensioning device, a pressure relief valve unit 12 is arranged within the piston hollow space 5. The pressure relief valve unit forms, with the inner lateral surface of the tensioning piston 3, which is hardened according to the purpose of the application, an interference fit, wherein the tensioning piston is constructed as an extruded part. The pressure relief valve unit further comprises a seat 13 for a main spring 14, whose pretensioning force acts on the receptacle 2 on one hand, which is connected rigidly to a component of the internal combustion engine (not shown), and whose pretensioning force acts, on the other hand, on the tensioning piston 3, whose discharge end 10 contacts a tensioning rail 26 of a chain drive (see, for example, FIG. 2).

Such tensioning devices 1 for the chain drive of an internal combustion engine are used to tension the timing chain (not shown) and to damp oscillations that occur in the chain drive. For this reason, the cylindrical hollow space 4 of the receptacle 2 and the piston hollow space 5 of the tensioning piston 3 form the pressure chamber 6 that is filled with hydraulic medium when the chain drive is being operated. The hydraulic medium is usually supplied as engine oil from the general hydraulic medium circuit. A slow response under dynamic loading forms the return side of the hydraulic damping. Sudden tensioning of the slack section therefore can lead to excessive loading of the timing chain. The pressure relief valve unit 12 weakens the described effect and is simultaneously used for venting.

Figure 2:
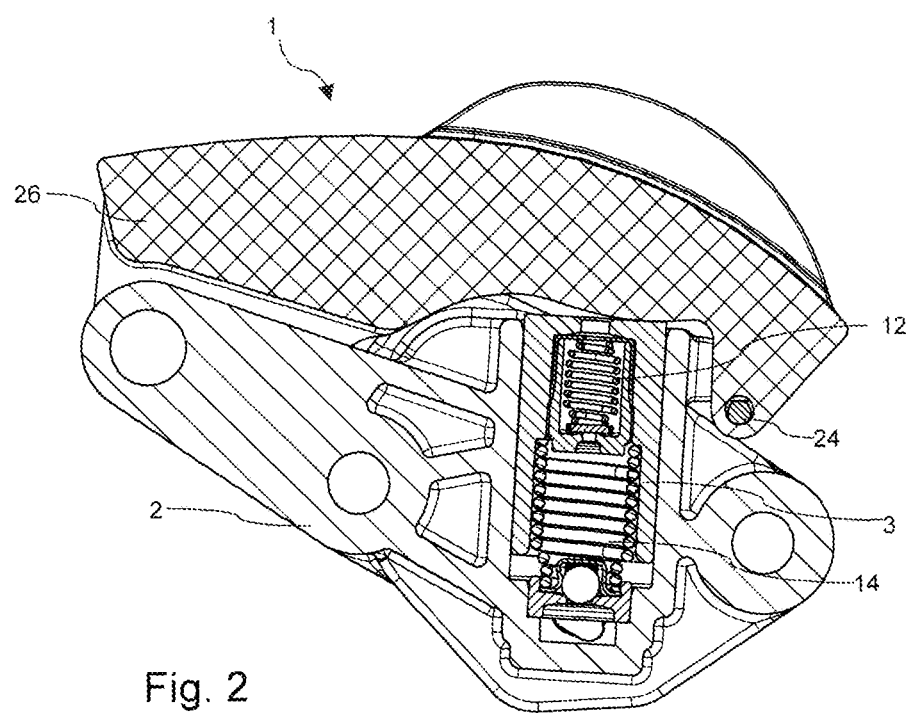
FIG. 2 shows a second embodiment of a hydraulic tensioning device.

A comparable tensioning device 1 is shown in FIG. 2. The pressure relief valve unit is pressed into a piston hollow space. The tensioning piston 12 is located in contact with a tensioning rail 26.

Figure 3:
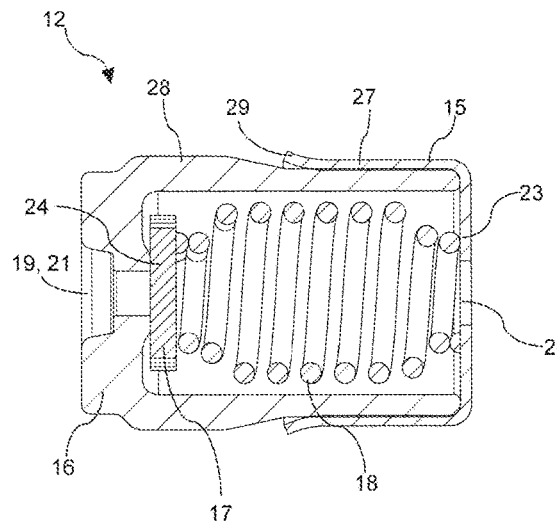
FIG. 3 shows a first embodiment of a pressure relief valve unit from FIG. 1.

In FIG. 3, the pressure relief valve unit 12 from FIG. 1 is shown in longitudinal section as a first embodiment. The pressure relief valve unit 12 includes a valve receptacle 15 that holds a valve seat 16, a valve plate 17 as a closing body, and a spring 18; in this way, a structural unit that can be preassembled is formed. The pressure relief valve unit exhibits a recess 19 on the valve seat 16 and another recess 20 on the valve receptacle 15, whereby a supply end and a discharge end 21, 22 of the pressure relief valve unit 12 are defined. On the discharge end 22, the valve receptacle 15 forms a spring seat 23 against which the spring 18 is supported. The spring loads the valve plate 17 with a pretensioning force, so that the valve plate 17 is supported against a sealing surface 24 of the valve seat 16; the recess 19 on the valve seat is closed in this way and released only in an operating state in which the pressure in the pressure chamber exceeds a predefined value.

The valve seat 16 is formed of a metallic material and can have a hardened surface. The valve seat 16 is held on the supply end 21 by the valve receptacle 15, supported on the discharge end 22 against the valve receptacle and is surrounded by this after its assembly in a first sub-section 27. A second sub-section 28 connects to the first sub-section 27 of the valve seat 16, wherein the first sub-section 27 of the valve seat 16 has a smaller diameter than the second sub-section. In the first sub-section 27, the valve receptacle 15 forms, with the inner lateral surface of the tensioning piston 3, an interference fit, wherein the valve receptacle 15 has an engagement position 29 on the end holding the valve seat 16.

Figure 4:
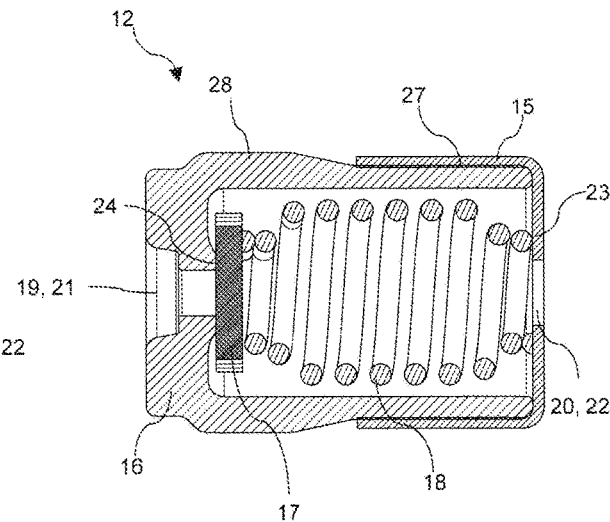
FIG. 4 shows an alternative embodiment of the pressure relief valve unit from FIG. 3.

In FIG. 4, an alternative construction of the pressure relief valve unit 12 is shown. The valve seat 16 has a first sub-section 27 and a second sub-section 28, wherein the valve seat 16 forms, in a second sub-section 28, an interference fit with the inner lateral surface of the tensioning piston 3. Otherwise, the construction corresponds to the design described in FIG. 3.

Figure 5:
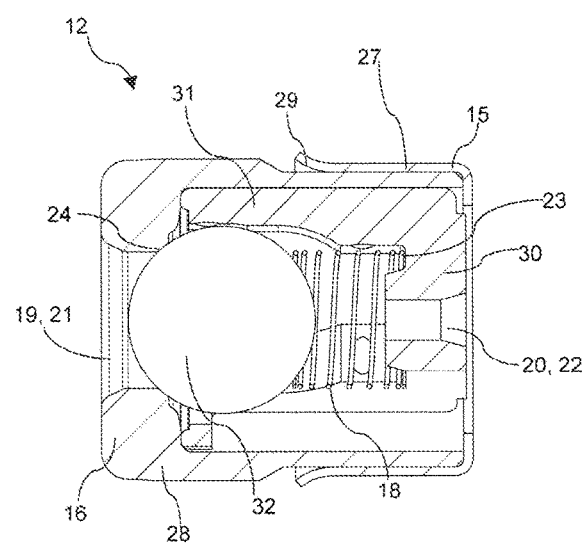
FIG. 5 shows a second embodiment of a pressure relief valve unit.

An alternative construction is shown in FIG. 5. A pressure relief valve unit with a ball 32 as a closing body and with an inner guide 30 is shown, wherein the inner guide 30 is held by a base of the valve receptacle 15. The inner guide 30 is arranged along the entire axial length of the inner periphery of the valve receptacle 15 and has three axially extending connecting pieces 31. Otherwise, the construction corresponds to the design described in FIG. 3.

Figure 6:
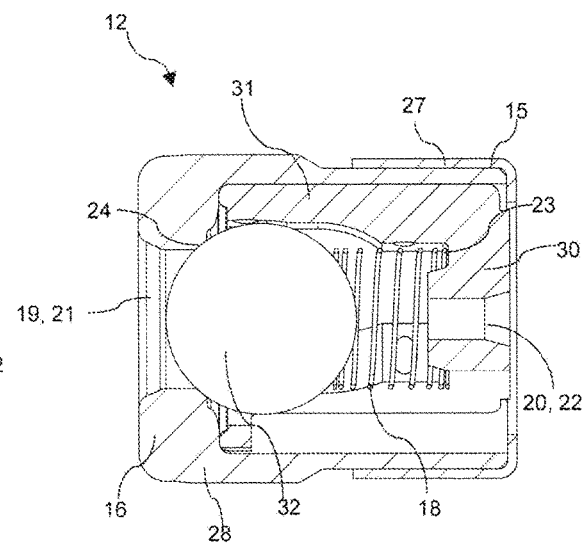
FIG. 6 shows an alternative embodiment of the pressure relief valve unit from FIG. 5.

In FIG. 6, another alternative construction is shown. A pressure relief valve unit with a ball 32 as the closing body and an inner guide 30 according to the embodiment of FIG. 5 is shown. Otherwise, the construction corresponds to the design described in FIG. 4.

LIST OF REFERENCE SYMBOLS

1 Tensioning device
2 Receptacle
3 Tensioning piston
4 Cylindrical hollow space of the receptacle
5 Piston hollow space
6 Pressure chamber
7 Recess
8 Recess
9 Supply end of the tensioning device
10 Discharge end of the tensioning device
11 Check valve
12 Pressure relief valve unit
13 Seat for a main spring
14 Main spring
15 Valve receptacle
16 Valve seat
17 Valve plate
18 Spring
19 Recess
20 Recess
21 Supply end of the pressure relief valve unit
22 Discharge end of the pressure relief valve unit
23 Spring seat
24 Sealing surface
25 Piston locking unit
26 Tensioning rail
27 First sub-section
28 Second sub-section
29 Engagement position
30 Internal guide
31 Connecting piece
32 Ball
33 Securing wire

The invention claimed is:

1. A hydraulic tensioning device for a chain drive of an internal combustion engine, the hydraulic tensioning device comprising:
   a housing with a receptacle having a cylindrical hollow space;
   a tensioning piston that is guided in the cylindrical hollow space of the receptacle, the tensioning piston including a piston hollow space;
   a pressure chamber formed by the piston hollow space and the cylindrical hollow space of the receptacle;
   a pressure relief valve unit arranged in the piston hollow space, the pressure relief valve unit comprises a pre-assembled structural unit including
      a spring,
      a closing body,
      a valve seat comprising a first sub-section and a second sub-section, and
      a valve receptacle surrounding the valve seat only in the first sub-section, the valve receptacle forms an interference fit with the valve seat, and the valve receptacle in the first sub-section forms an interference fit on a radially outer surface of the valve receptacle with an inner lateral surface of the tensioning piston.

2. The tensioning device according to claim 1, wherein the valve receptacle is comprised of plastic or metallic, non-hardened material.

3. The tensioning device according to claim 1, wherein the tensioning piston comprises a molded component.

4. The tensioning device according to claim 1, wherein the pressure relief valve unit includes a supply end and a discharge end, valve receptacle on the discharge end includes a recess and a surface for supporting the spring, and the valve receptacle holds the valve seat by the supply end.

5. The tensioning device according to claim 4, wherein the valve seat includes a recess on the supply end and a sealing surface for the closing body.

6. The tensioning device according to claim 1, wherein the valve seat has, in the first sub-section, a smaller outer diameter than in the second sub-section.

7. The tensioning device according to claim 1, wherein the closing body is a spherical shaped or plate shaped.

8. The tensioning device according to claim 1, wherein the valve receptacle has an engagement position on an end thereof holding the valve seat.

9. The tensioning device according to claim 1, wherein the tensioning piston or an inner lateral surface of the piston hollow space has a hardened construction and the valve seat is made from a metallic material, and the valve seat or a surface of the valve seat has a hardened construction.

10. The tensioning device according to claim 1, wherein the pressure relief valve unit comprises a ball as a closing body and an inner guide, and the inner guide is held by a base of the valve receptacle.

11. A hydraulic tensioning device for a chain drive of an internal combustion engine, the hydraulic tensioning device comprising:
   a housing with a receptacle having a cylindrical hollow space;

a tensioning piston that is guided in the cylindrical hollow space, the tensioning piston including a piston hollow space;

a pressure chamber formed by the piston hollow space and the cylindrical hollow space of the receptacle;

a preassembled pressure relief valve unit arranged in the piston hollow space, the pressure relief valve unit comprises a preassembled structural unit including a spring, a closing body, a valve seat, and a valve receptacle surrounding at least a portion of the valve seat with an interference fit;

wherein the valve seat has a first sub-section and a second sub-section, and the valve receptacle only surrounds the valve seat in the first sub-section, at least one of the valve receptacle or the valve seat form an interference fit with an inner lateral surface of the tensioning piston.

12. The hydraulic tensioning device of claim 11, wherein the valve receptacle is comprised of plastic or metallic, non-hardened material.

13. The hydraulic tensioning device of claim 12, wherein the inner lateral surface of the tensioning piston is formed of a hardened material.

14. The hydraulic tensioning device of claim 13, wherein the valve seat is made from a metallic material and at least a surface of the valve seat is hardened.

15. The hydraulic tensioning device of claim 11, wherein the valve receptacle engages with the interference fit with the inner lateral surface of the tensioning piston, and the plastic or metallic, non-hardened material permits an increased tolerance between an outside surface of the valve receptacle and the inner lateral surface of the tensioning piston in comparison to an interference fit between two hardened surfaces.

16. The hydraulic tensioning device of claim 11, wherein the valve seat includes a recess on a supply end and a sealing surface for the closing body on a discharge end.

* * * * *